United States Patent [19]
Otto et al.

[11] Patent Number: 5,506,025
[45] Date of Patent: Apr. 9, 1996

[54] EXPANDABLE BAFFLE APPARATUS

[75] Inventors: David J. Otto, Lake Orion; Robert D. Myers, Redford, both of Mich.

[73] Assignee: SIKA Corporation, Southfield, Mich.

[21] Appl. No.: 370,481

[22] Filed: Jan. 9, 1995

[51] Int. Cl.$^6$ ........................................................ B32B 5/00
[52] U.S. Cl. ........................... 428/98; 52/404.1; 428/99; 428/124; 428/138; 428/474.4; 428/475.8; 428/476.3; 428/913; 428/920
[58] Field of Search ................................ 428/99, 98, 124, 428/138, 474.4, 475.8, 476.3, 913, 920; 52/404; 156/71

[56] References Cited

U.S. PATENT DOCUMENTS

| | | | |
|---|---|---|---|
| 4,756,945 | 7/1988 | Gibb | 428/124 |
| 4,874,650 | 10/1989 | Kitoh | 156/79 |
| 4,898,630 | 2/1990 | Kitoh | 428/68 |
| 5,266,133 | 11/1993 | Hanley | 156/71 |
| 5,373,027 | 12/1994 | Hanley | 521/84.1 |

*Primary Examiner*—Nasser Ahmad
*Attorney, Agent, or Firm*—Hovey, Williams, Timmons & Collins

[57] ABSTRACT

An expandable baffle apparatus for sealing a cavity of an automobile or the like includes a piece of heat expandable sealing material that is formed in a shape corresponding to the shape of the cross section of the cavity to be sealed. A support element supports the piece of sealing material at the predetermined cross section while the apparatus is subjected to an elevated activation temperature at which the sealing material expands to seal the cavity at the cross section. The support element is formed of a material having a melting point higher than the activation temperature, and includes an open lattice formed of a shape corresponding to the shape of the cross section of the cavity. The sealing material is supported on the lattice so that when the sealing material is activated, the material expands radially to fill the cross section of the cavity and longitudinally through the lattice.

11 Claims, 2 Drawing Sheets

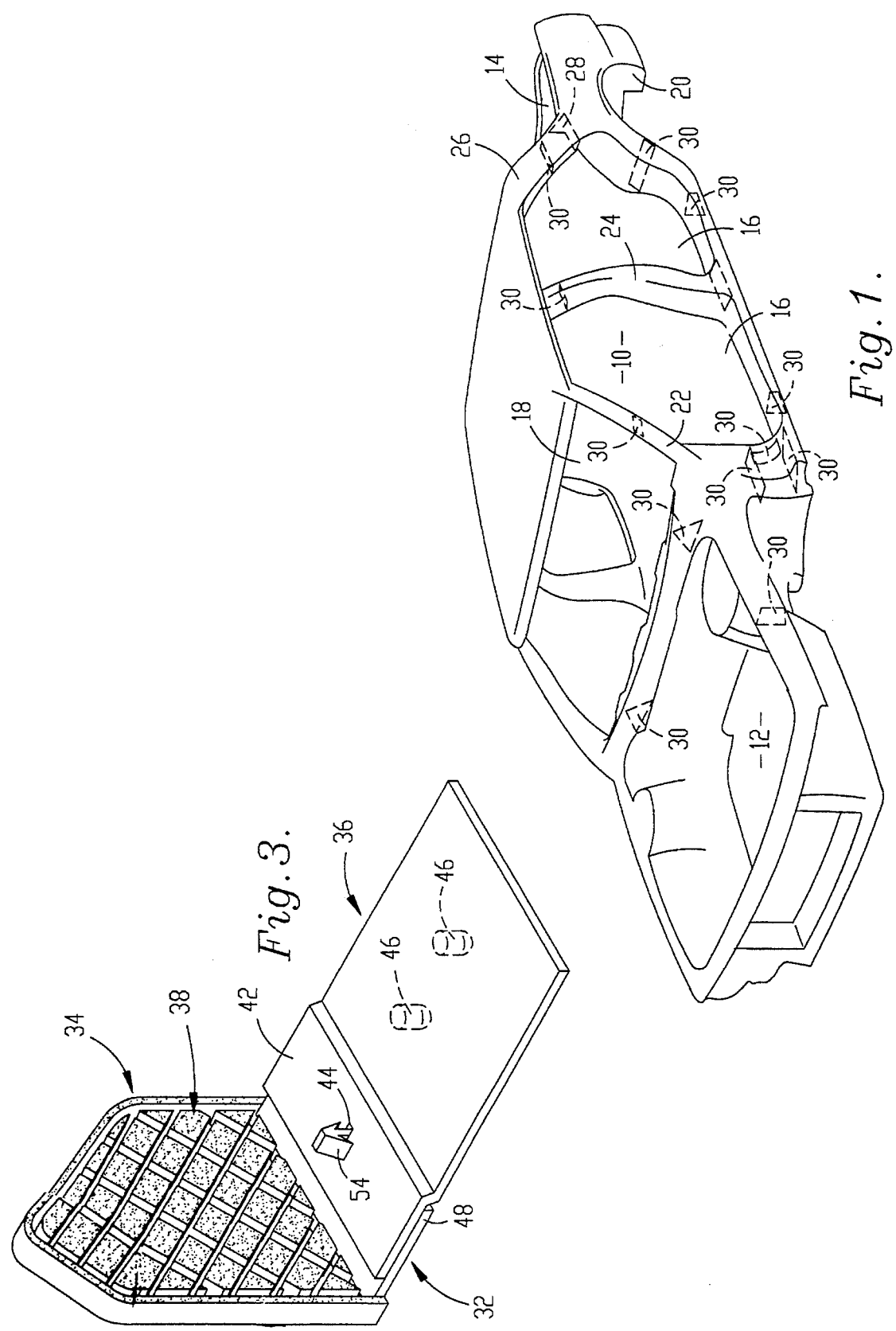

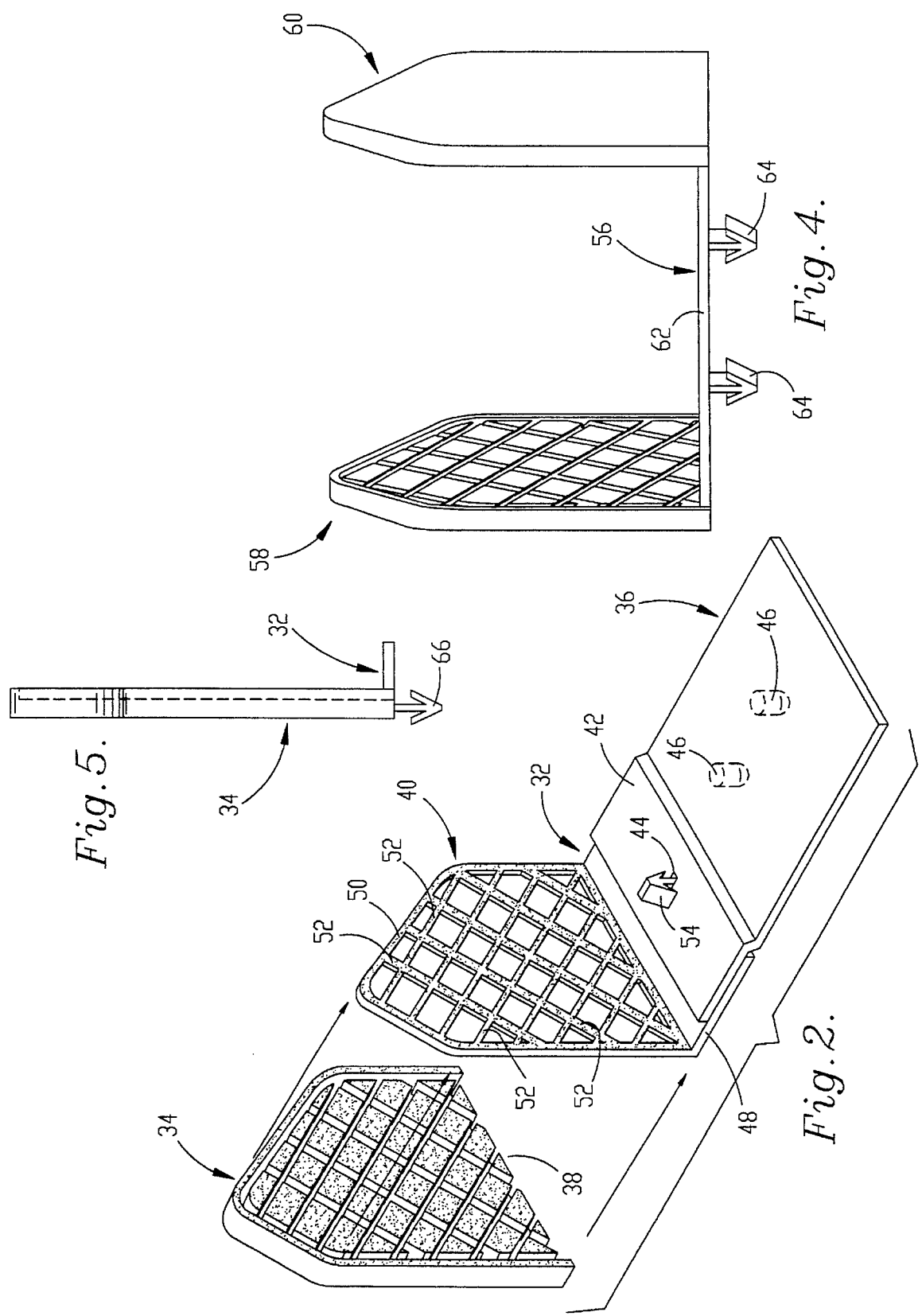

EXPANDABLE BAFFLE APPARATUS

BACKGROUND OF THE INVENTION

1. Field of the Invention

The present invention relates generally to expandable baffle products for sealing the cavities of automobiles and other articles of manufacture and, more particularly, to a baffle apparatus including a piece of heat activated sealing material and a support element on which the sealing material is supported before, during and after activation of the sealing material.

2. Discussion of the Prior Art

During the fabrication of automobiles, trucks and similar over-the-road vehicles, many body components present cavities which require sealing to prevent ingress of moisture and contaminants which can cause corrosion of the body parts. This is especially true with respect to unibody structures in which a heavy frame is replaced with a structurally designed space frame that inherently presents a number of moisture and contaminant collecting cavities. These cavities also serve as passages which attenuate noise and other sounds transmitted through the cavities during normal use of the vehicle.

For example, the upright post structure of a vehicle's body defining a portion of a respective window opening presents an elongated passage or cavity which can collect moisture and contaminants and also transmit annoying sounds unless the passage or cavity is at least partially filled with a sealant material that blocks entrance of moisture and debris, and that also serves as a baffle for muting sounds that would otherwise be transmitted along the length of the passage or cavity. There are other irregular cavities in a vehicle body which desirably are sealed to prevent moisture, noise and contaminants from entering that area and being conveyed to other parts of the interior of the vehicle body.

Many attempts have been made to seal these cavities, including spraying of a sealant into the cavity, introduction of foam products into such cavities, and use of fiberglass matting and the like. These past efforts have not been entirely satisfactory because of the inefficiency of the sealing and baffling methods, the relatively high cost of the sealing process, and the fact that erratic sealing has resulted in many instances.

Foaming in-place has not been totally satisfactory because of the difficulty in controlling where the foam travels upon introduction of the foam into a vehicle body cavity or the like, and the fact that more foam than is actually needed is usually introduced into the body cavity to provide some degree of redundancy in preventing entry of moisture into the cavity during use of the vehicle. Furthermore, foams have a finite life insofar as flexibility is concerned before becoming rigid, thus limiting the time available during which the foam may be introduced into the vehicle cavity. In addition, if the interior surface of the cavity had a somewhat oily surface, the foams would not adequately adhere to that surface and provide an effective seal.

Other types of foam or foamable products are tacky in nature and thus cannot readily be positioned at the exact required disposition in the selected cavity. Such products also present unique packaging problems to the manufacturer, and require special handling during installation.

Certain sealant and baffling materials also are sensitive to the elevated temperature conditions to which a vehicle body may be subjected during fabrication of a vehicle thus causing disruption of the sealant and sound attenuating properties of the sealant. For example, when an automobile body is baked, it is placed in an oven and exposed to an elevated temperature, e.g. 177° C. (350° F.), for a period of approximately 30–45 minutes. As the temperature of the baffling material increases, the material softens and sags, deforming to a point at which it no longer is able to expand to fill the cavity.

It is known to support foamable products by sandwiching foamable material between a pair of spaced parallel sheets of aluminum or the like that are then fastened within the cavity, or to provide a shelf in the cavity to which a foamable product may be fastened. Yet another known construction includes a support element having a circumferential edge on which foamable material may be adhered so that expansion of the foam is directed radially outward by the support element. However, such conventional systems for supporting foamable baffles within a cavity restrict the flow of sealing material in one direction or another during expansion of the material, and add weight, complexity and cost to the apparatus.

OBJECTS AND SUMMARY OF THE INVENTION

It is an object of the present invention to provide a lightweight, relatively inexpensive baffle apparatus having a simple construction which provides a directed sealing flow of baffle material against the walls of a cavity and in both directions along the length thereof so that the cavity is effectively sealed against moisture and noise.

It is another object of the invention to provide a baffle apparatus having a support element that supports a piece of sealing material within the cavity before, during and after expansion of the sealing material, wherein the support element does not significantly restrict expansion of the sealing material, but directs expansion against and along the walls of the cavity. In addition, the support element prevents the sealing material from sagging within or falling out of the cavity during heating of the apparatus, regardless of the orientation of the apparatus within the cavity.

In accordance with these and other objects evident from the following description of a preferred embodiment of the invention, an expansible baffle apparatus is provided for sealing a cavity of an article of manufacture at a predetermined cross section of the cavity. The apparatus includes a piece of heat expandable sealing material having an activation temperature at which the material expands, and a support element for supporting the sealing material at the predetermined cross section while the sealing material expands to seal the cavity at the cross section.

The support element is formed of a material having a melting point higher than the activation temperature, as well as the bake temperature, and includes an open lattice on which the sealing material is supported. Both the lattice and the piece of sealing material are formed in a shape corresponding to the shape of the cross section of the cavity, and the piece of sealing material is supported on the lattice so that when the sealing material is activated, the material expands radially to fill the cross section of the cavity and longitudinally through the lattice.

By providing a construction in accordance with the present invention, numerous advantages are realized. For example, by supporting the piece of sealing material on the lattice of the support element, expansion of the sealing material is directed by the lattice without being restricted. At the same time, the support element prevents the sealing material from sagging or dropping out of position within the cavity at elevated temperatures.

BRIEF DESCRIPTION OF THE DRAWING FIGURES

The preferred embodiment of the present invention is described in detail below with reference to the attached drawing figures, wherein:

FIG. 1 is a perspective view of an automobile body, illustrating various pillars within which the baffle apparatus of the present invention may be utilized;

FIG. 2 is an exploded perspective view of a baffle apparatus constructed in accordance with the preferred embodiment;

FIG. 3 is a perspective view of the baffle apparatus;

FIG. 4 is a perspective view of another baffle apparatus constructed in accordance with the preferred embodiment; and FIG. 5 is a side elevational view of yet another baffle apparatus constructed in accordance with the preferred embodiment.

DETAILED DESCRIPTION OF THE PREFERRED EMBODIMENT

An automobile body is illustrated in FIG. 1, and includes several interconnected, hollow frame elements or pillars that define a passenger compartment 10, engine compartment 12, trunk 14, doorways 16, windows 18 and wheel wells 20.

It is conventional to refer to the pillars by letter, with the front side pillars 22 being the "A" pillars, the middle side pillars 24 being the "B" pillars, the rear side pillars 26 being the "C" pillars, etc. working backward on the body structure. Alternately, pillars are referenced by the shape of the pillar or by the function they perform. For example, the rear pillar 26 extending between the trunk and the roof of the body is sometimes referred to as a sail pillar because it looks like a sail, and the front pillar 22 extending upward in front of the doors of the automobile is called a wind shield pillar because it receives the front wind shield for the vehicle.

The area designated by the dotted line 28 at the lower rear end of the sail pillar or "C" pillar 26 of the body is the particular cavity for which the illustrated baffle apparatus is constructed. However, it is understood that a baffle apparatus in accordance with the invention may be constructed of any desired configuration in order to permit use of the apparatus within any other cavity in the body. Likewise, the apparatus may be utilized in any other article of manufacture for sealing a cavity within the article.

Examples of other locations within the cavities of the body at which sealing may be desired are shown by the dotted lines 30. These locations include both horizontal and vertical cavities, and may be located at the lower or upper ends of the pillars, as well as anywhere in between.

A baffle apparatus for use in sealing the lower end of the sail pillar is shown in FIG. 2, and broadly includes a support element 32 and two molded pieces 34, 36 of sealing material.

The first sealing piece 34 is adapted to seal a predetermined vertical cross section of the sail pillar cavity having a five-sided polygonal shape, and is formed of a corresponding shape, but of a size slightly smaller than that of the cross section. This construction permits placement of the apparatus within the cavity, while permitting the sealing material to expand radially to seal against the pillar upon heating to an activation temperature of the material. This designed space, as well, allows fluid drainage during the washing, pre-preparation, priming process that a vehicle body structure encounters during assembly.

The sealing piece 34 is preferably injection molded in the desired shape, and includes opposed planer surfaces that are spaced from one another by the thickness of the material. One of the planer surfaces is formed with a depression 38 that corresponds in both size and shape with the size and shape of a lattice 40 of the support element 32. The depression is at least as deep as the lattice is thick, and functions as a means for retaining the sealing piece 34 on the support element by permitting the piece to be assembled on the element in the manner shown in FIG. 3.

The second sealing piece 36 is formed of the same material as the first piece 34 or the like, and is adapted to seal the bottom wall of the sail pillar 26 which overlies one of the wheel wells 20 of the automobile body. By sealing this wall, vibration and noise from the wheels and trunk of the automobile are baffled to prevent them from reaching the passenger compartment.

The shape of the second piece 36 corresponds to the shape of the bottom wall of the pillar, and is sized slightly smaller than the wall to permit placement of the apparatus and to accommodate build variations in the automobile. Preferably, although not limited to such, the piece 36 is generally rectangular, including a stepped region 42 having a central slot 44 by which the piece is retained on the support element. Locating pins 46 are formed on the bottom of the piece for locating the apparatus within the sail pillar during assembly and restrict movement during the assembly process.

The two sealing pieces 34, 36 are formed of a dry, initially non-tacky material that becomes tacky upon expansion so that the sealing material adheres to the article within the cavity when the apparatus is heated to the activation temperature at which the material expands. An exemplary material is disclosed in U.S. Pat. No. 5,266,133, to Hanley et al., which is incorporated herein by this reference. Such a material is marketed under the name SIKALASTOMER 240 by Sika Corporation. However, any other suitable sealing material may be employed so long as it is able to expand sufficiently upon activation to seal the cross section of the cavity within which it is positioned.

One necessary characteristic of the sealing material is that the material must possess an activation temperature lower than or equal to the temperature at which the automobile body is baked during manufacture. For example, it is conventional to employ a bake temperature of about 177° C. (350° F.) in the manufacture of automobiles. Accordingly, the selected sealing material must possess an activation temperature lower than this value, e.g. 149° C. (300° F.).

As shown in FIG. 2, the support element 32 is adapted to support the two pieces 34, 36 of sealing material at a predetermined location within the pillar cavity while the automobile body is subjected to the elevated temperature, and includes a base 48 and the lattice 40. The support element is formed of a material having a melting point that is higher than both the activation temperature of the sealing material and the bake temperature to which the automobile body is to be exposed. Preferably, the temperature at which the material of the support element softens is also above the bake temperature. By employing a material having this characteristic, it is possible for the support element to substantially maintain its shape before, during and after the baking operation, and to support the sealing pieces. Preferably, the support element is formed of a moldable material that is pliable so that special handling of the apparatus is not required and the apparatus may be subjected to bending forces without being cracked or permanently deformed. An exemplary material is a black, heat stabilized lubricated 33% glass-reinforced 66 nylon having a heat deflection temperature at 1.8 MPa of 240° C. (464° F.) and a melting point of 262° C. (504° F.). Such a material is marketed as NYLIND 51HSL BK001 by DuPont. However, other similar materials may be used depending upon the desired physical characteristics thereof.

The lattice 40 of the support element is formed of a shape corresponding to the shape of the cross section of the cavity, but of a size smaller than both the cross-section and the first sealing piece 34. The lattice includes a peripheral strip 50 that defines the shape of the lattice, and a plurality of interconnected, crossed strips 52 interior of and connected to the peripheral strip. Thus, a rigid support structure is defined by the peripheral and crossed strips 50, 52, while a plurality of openings are defined in the lattice. The size, shape and number of openings in the lattice may be varied from application to application to obtain the optimum baffling characteristics within the cavity.

The depression 38 in the first sealing piece 34 includes a peripheral groove and a plurality of crossed grooves, and corresponds in both size and shape with the lattice so that the first sealing piece may be pressed onto the support element with the strips nesting in the grooves of the depression. The first sealing element is retained in place on the support element by this interconnection.

The base 48 of the support element 32 extends at an angle of about 90° relative to the lattice 40, and is generally rectangular in shape. The base includes an upstanding fastener 54 that is inserted through the slot 44 of the second sealing piece 36 during assembly for holding the second piece in place on the apparatus.

In the application of the illustrated embodiment, wherein the lower end of the sail pillar 26 is to be sealed, the apparatus is adapted to sit on the lower wall of the pillar, with the lattice 40 extending in a vertical plane within the cavity. The base supports the lattice and the first sealing piece in this orientation, and allows the second sealing piece 36 to be secured to the apparatus by the fastener so that the second piece rests horizontally on the lower wall of the pillar. The side walls of the pillar extend upward along the sides of the lattice and of the first sealing element, and converge toward one another at the apex of the first sealing element.

Once the apparatus has been positioned within the cavity, it remains in place until such time as the automobile body is exposed to an elevated temperature sufficient to activate the sealing material and cause the material to expand against the walls of the pillar. Any of a number of process or manufacturing steps may be carried out on the automobile body prior to baking, without affecting the ability of the sealing pieces to expand when exposed to the activating temperature.

As the automobile body is baked, and the temperature of the sealing pieces 34, 36 approaches the activation temperature, there is a tendency for the pieces to soften and sag under the force of gravity. However, the material of the first piece 34 is retained in place within the cavity by the individual strips 50, 52 of the lattice 40, and is not allowed to sag significantly enough to reduce the ability of the piece to seal against the top and sides of the pillar. Because the second piece 36 of sealing material is resting on the horizontal bottom wall of the pillar, it is not necessary to provide a lattice to support it.

Once the activation temperature of the sealing material is reached, the material begins to expand in all directions. Thus, the portion of material of the first sealing piece 34 that is provided around the peripheral strip expands radially within the plane of the lattice toward and against the walls of the pillar 26, and the sealing material within the openings of the lattice expands longitudinally of the cavity in both directions. In addition, the material along the lower edge of the piece expands downward against the bottom wall of the pillar.

At the same time, the material of the second sealing piece 36 expands horizontally in all directions to cover the bottom wall of the pillar and seal against the side walls. The second piece also expands upward, increasing the thickness of the piece.

The support element 32 directs expansion of the material of the first piece 34 radially outward toward the walls of the pillar, while permitting longitudinal expansion to both sides of the lattice in a direction perpendicular to the cross section being sealed. At the same time, the support element becomes embedded within the sealing material so that it is always present to support the sealing material within the cavity.

An alternate construction of the preferred baffle apparatus is illustrated in FIG. 4, and includes a support element 56 and two pieces of sealant material 58, 60. The support element includes a base 62 and two upstanding, parallel lattices, each supporting one of the sealing pieces 58, 60. The base 62 is generally rectangular, and includes a pair of depending fasteners 64 for securing the apparatus within the cavity of an article of manufacture, such as the pillar of an automobile body. Each lattice is relatively identical to one another and to the lattice 40 shown in FIG. 2, and is adapted to support one of the sealing pieces on the apparatus.

The sealing pieces 58, 60 are relatively similar to one another, and to the sealing piece 34 shown in FIG. 2. Each of the pieces 58, 60 are provided with a depression corresponding in shape and size with the lattice on which it is supported. Thus, the sealing pieces are supported on the apparatus at a fixed distance apart from one another so that, upon activation of the sealing material, each of the two pieces will expand against the walls of the pillar, and toward and away from one another.

If the cavity is of a non-uniform cross section, each of the lattices and each of the sealing pieces may be formed of shapes corresponding to the cross sectional shape of the pillar at the cross section to be sealed by each piece. Therefore, it is not necessary for the two pieces to be identical to one another, but only that each piece be of a shape corresponding to the shape of the cross section being sealed by that piece.

By providing a construction employing two spaced, parallel sealing pieces, improved sound and vibration dampening may be achieved, and the effectiveness of the apparatus is improved. In addition, an improved barrier to moisture and debris is attained. The actual distance of separation between the sealing pieces is preferably selected to optimize the vibration and sound reducing characteristics of the apparatus for the given article of manufacture.

Turning to FIG. 5, another construction of the preferred embodiment is shown, wherein a fastener 60 is provided on the sealing piece for securing the apparatus in place within an article of manufacture. Because both the support element and the sealing pieces are formed of moldable materials, it is possible to form one or more fasteners in either or both of the components.

Where it is necessary to provide a strong holding force to support the apparatus within a cavity, it is preferred that the fastener be formed in the support element, which is stronger than the sealing material and retains its shape after the sealing material has expanded. However, in applications where it is necessary to provide support of the baffle apparatus only until expansion of the sealing material is achieved, the fastener may be formed in the sealing piece.

Although the present invention has been described with reference to the preferred embodiment illustrated in the attached drawing figures, it is noted that substitutions may be made and equivalents employed herein without departing from the scope of the invention as recited in the claims. For example, although the preferred embodiment is illustrated in connection with a particular application in the lower end of a sail pillar of an automobile body, the invention may be employed in constructing baffle apparatuses for use in sealing a cavity of any desired shape or size, in either horizontal, vertical or angled orientations.

What is claimed is:

1. A lightweight expandable baffle apparatus for sealing a cavity of a vehicle body at a predetermined cross section of the cavity, the apparatus comprising:

a piece of heat expandable sealing material that is formed in a shape corresponding to but smaller than the shape of the cross section of the cavity, the sealing material having an activation temperature lower than 149° C. at which the material expands; and a rigid support element for supporting the piece of sealing material at the predetermined cross section while the apparatus is subjected to the activation temperature and the sealing material expands to seal the cavity at the cross section, the support element being formed of a material having a melting point higher than the activation temperature, and including an open lattice formed of a shape corresponding to but smaller than the shape of the piece of sealing material and including a peripheral strip and a plurality of crossed strips interior of and connected to the peripheral strips, the piece of sealing material being supported on the lattice so that when the sealing material is activated, the material expands radially beyond the support element to fill the cross section of the cavity and longitudinally both through and away from the lattice within the cavity.

2. The apparatus as recited in claim 1, further comprising a fastening means for fastening the apparatus in place within the cavity at the cross section.

3. The apparatus as recited in claim 2, wherein the fastening means includes a mechanical fastener formed of sealing material.

4. A lightweight expandable baffle apparatus for sealing a cavity of a vehicle body at a predetermined cross section of the cavity, the apparatus comprising:

a piece of heat expandable sealing material that is formed in a shape corresponding to the shape of the cross section of the cavity, the sealing material having an activation temperature lower than 149° C. at which the material expands:

a rigid support element for supporting the piece of sealing material at the predetermined cross section while the apparatus is subjected to the activation temperature and the sealing material expands to seal the cavity at the cross section, the support element being formed of a material having a melting point higher than the activation temperature, and including an open lattice formed of a shape corresponding to the shape of the cross section of the cavity and including a peripheral strip and a plurality of crossed strips interior of and connected to the peripheral strips, the piece of sealing material being supported on the lattice so that when the sealing material is activated, the material expands radially to fill the cross section of the cavity and longitudinally through the lattice; and a fastening means for fastening the apparatus in place within the cavity at the cross section, the fastening means including a mechanical fastener formed of the same material as the support element.

5. A lightweight expandable baffle apparatus for sealing a cavity of a vehicle body at a predetermined cross section of the cavity, the apparatus comprising:

a piece of heat expandable sealing material that is formed in a shape corresponding to but smaller than the shape of the cross section of the cavity, the sealing material having an activation temperature lower than 149° C. at which the material expands; and a rigid support element for supporting the piece of sealing material at the predetermined cross section while the apparatus is subjected to the activation temperature and the sealing material expands to seal the cavity at the cross section, the support element being formed of a material having a melting point higher than the activation temperature, and including an open lattice formed of a shape corresponding to but smaller than the shape of the piece of sealing material of the cross section of the cavity and including a peripheral strip and a plurality of crossed strips interior of and connected to the peripheral strips, the piece of sealing material including opposed planer surfaces, wherein one of the surfaces includes a depression corresponding in shape and size with the lattice of the support element so that the support element nests in the depression to support the sealing element, the material expanding radially beyond the support element when activated to fill the cross section of the cavity and expanding longitudinally both through and away from the lattice.

6. The apparatus as recited in claim 1, wherein the apparatus includes two pieces of sealing material for sealing the cavity at two predetermined cross sections of the cavity that are spaced from one another, the support element including a pair of lattices that are parallel to and spaced from one another and on which the two pieces of sealing material are supported so that when the sealing material is activated, the material of each of the two pieces expands radially to fill the cross section of the cavity and longitudinally through the lattice on which the piece is supported.

7. The apparatus as recited in claim 1, wherein the cavity of the article is formed by a plurality of walls, the apparatus further comprising an additional piece of heat expansible sealing material that is formed in a shape corresponding to the shape of one of the walls adjacent the cross section; and a means for fastening the additional piece of sealing material to the support element so that when the apparatus is positioned in the cavity and heated to the activation temperature, the additional piece of sealing material is activated and expands to cover the one wall.

8. The apparatus as recited in claim 1, wherein the sealing material is a dry, initially non-tacky material that becomes tacky upon expansion so that the sealing material adheres to the article within the cavity when the apparatus is heated to the activation temperature.

9. The apparatus as recited in claim 1, wherein the sealing material includes predetermined portions of an ionomer, a blowing agent, and a tackifier.

10. The apparatus as recited in claim 1, wherein the support element is formed of nylon.

11. The apparatus as recited in claim 1, wherein the support element is formed of glass reinforced nylon.

* * * * *